United States Patent
Evarts et al.

(10) Patent No.: US 8,564,424 B2
(45) Date of Patent: Oct. 22, 2013

(54) STEERING WHEEL HAND POSITION SENSING DEVICE

(75) Inventors: Tristan J. Evarts, Londonderry, NH (US); Paige E. Balcom, Londonderry, NH (US); Jaiden R. Evarts, Londonderry, NH (US); Emily A. Balcom, Londonderry, NH (US); Kathryn J. Balcom, Londonderry, NH (US); Bryeton A. Evarts, Londonderry, NH (US)

(73) Assignee: Inventioneers Etc., LLC, Londonderry, NH (US)

( * ) Notice: Subject to any disclaimer, the term of this patent is extended or adjusted under 35 U.S.C. 154(b) by 149 days.

(21) Appl. No.: 12/962,122

(22) Filed: Dec. 7, 2010

(65) Prior Publication Data

US 2011/0133919 A1    Jun. 9, 2011

Related U.S. Application Data

(60) Provisional application No. 61/283,608, filed on Dec. 7, 2009.

(51) Int. Cl.
B60Q 1/00    (2006.01)

(52) U.S. Cl.
USPC ....... 340/439; 340/575; 340/426.24; 340/576

(58) Field of Classification Search
USPC ............................. 340/439, 575, 426.24, 576
See application file for complete search history.

(56) References Cited

U.S. PATENT DOCUMENTS

| | | | |
|---|---|---|---|
| 4,210,905 A | 7/1980 | Coons | |
| 4,259,665 A | 3/1981 | Manning | |
| 4,485,375 A | 11/1984 | Hershberger | |
| 5,585,785 A | 12/1996 | Gwin et al. | |
| 6,114,949 A | 9/2000 | Schmitz et al. | |
| 6,218,947 B1 | 4/2001 | Sutherland | |
| 6,575,902 B1 | 6/2003 | Burton | |
| 6,731,925 B2 | 5/2004 | Naboulsi | |
| 6,868,934 B2 | 3/2005 | Dirrig | |
| 6,886,653 B1 | 5/2005 | Bellehumeur | |
| 7,019,623 B2 | 3/2006 | Klausner et al. | |
| 7,414,520 B2 * | 8/2008 | Mei.beta.ner | 340/438 |
| 7,605,693 B2 | 10/2009 | Kulas | |
| 7,710,279 B1 | 5/2010 | Fields | |
| 2001/0054326 A1 * | 12/2001 | Onodera et al. | 74/552 |
| 2002/0015024 A1 * | 2/2002 | Westerman et al. | 345/173 |

(Continued)

Primary Examiner — Hoi Lau
(74) Attorney, Agent, or Firm — Maine Cernota & Rardin

(57) ABSTRACT

A system is provided for the detection of user hand position on a steering wheel, the system having: a sensor array disposed on the circumference of the wheel configured to detect contact of first and second user hands with the sensor array; a processor whereby data from the sensor array is received and processed generating user hand size, location and movement data; at least one feedback device whereby a user is alerted to an unsafe hand position. the processor being configured to detect conditions in the size, location, and movement data indicative of unsafe user hand position, allow a delay for correction of the condition and communicate existence of the condition for a period exceeding the delay to the at least one feedback device; a data logger configured to record the conditions in the size, location, and movement data indicative of the unsafe user hand position; a tamper indicator whereby unauthorized access to the sensor array, the processor, or the at least one feedback device is communicated to authorized noticees; a transceiver communicating with the processor whereby data relating to unsafe user hand positions is transmitted to the authorized noticees.

18 Claims, 9 Drawing Sheets

(56) References Cited

U.S. PATENT DOCUMENTS

| | | |
|---|---|---|
| 2004/0041703 A1* | 3/2004 | Bergman et al. ............. 340/514 |
| 2004/0267422 A1 | 12/2004 | Bossler |
| 2005/0219064 A1* | 10/2005 | Arnouse ....................... 340/945 |
| 2007/0262965 A1* | 11/2007 | Hirai et al. ................... 345/173 |
| 2007/0268158 A1* | 11/2007 | Gunderson et al. ........... 340/933 |
| 2008/0042856 A1* | 2/2008 | Power ........................... 340/575 |
| 2009/0091435 A1* | 4/2009 | Bolourchi ..................... 340/435 |
| 2009/0167682 A1* | 7/2009 | Yamashita et al. ............ 345/158 |
| 2009/0189772 A1 | 7/2009 | Christ et al. |
| 2010/0073182 A1* | 3/2010 | Gori ............................. 340/668 |
| 2011/0115617 A1* | 5/2011 | Bennett ........................ 340/439 |

* cited by examiner

STEERING WHEEL HAND POSITION SENSING DEVICE

RELATED APPLICATIONS

This application claims the benefit of U.S. Provisional Application No. 61/283,608, filed Dec. 7, 2009. This application is herein incorporated by reference in its entirety for all purposes.

FIELD OF THE INVENTION

The present invention relates generally to driver safety monitoring and training devices and more specifically it relates to a steering wheel hand position sensing device for sensing and monitoring the driver's hand location on the steering wheel and to provide instant feedback to the driver to maintain two-handed driving.

BACKGROUND OF THE INVENTION

Distracted driving and automobile accidents are significant causes of fatalities and injury. Causes of distracted driving include, but are not limited to the use of cell phone and other electronic devices while driving such as text message devices, smart phones, even entertainment devices like mp3 players. While drivers are trained to maintain proper hand position on the steering wheel while driving, often hand position is neglected resulting in diminished dexterity while driving and allowing for use by one or both hand of distracting devices.

Young drivers may be especially sensitive cases, where suitable parental intervention may help establish long term habits before bad habits are established. In unsupervised positions, it is not possible for a parent or adult to know if unsafe driving behavior is being undertaken.

What is needed, therefore, are techniques for prompting safe driving hand position.

SUMMARY OF THE INVENTION

One embodiment of the present invention provides a system for the detection of user hand position on a steering wheel, the system having: a sensor array disposed on the circumference of the wheel configured to detect contact of first and second user hands with the sensor array; a processor whereby data from the sensor array is received and processed generating user hand size, location and movement data; at least one feedback device whereby a user is alerted to an unsafe hand position. the processor being configured to detect conditions in the size, location, and movement data indicative of unsafe user hand position, allow a delay for correction of the condition and communicate existence of the condition for a period exceeding the delay to the at least one feedback device; a data logger configured to record the conditions in the size, location, and movement data indicative of the unsafe user hand position; a tamper indicator whereby unauthorized access to the sensor array, the processor, or the at least one feedback device is communicated to authorized noticees; a transceiver communicating with the processor whereby data relating to unsafe user hand positions is transmitted to the authorized noticees.

Another embodiment of the present invention provides such a system having a vehicle movement indicator, the vehicle movement indicator communicating vehicle direction, speed, and acceleration data to the processor.

A further embodiment of the present invention provides such a system wherein the vehicle movement indicator is an accelerometer.

Yet another embodiment of the present invention provides such a system wherein the sensor array comprises sensors selected from the group of sensors consisting of: magnetic sensors, field effect sensing sensors, optical sensors, mechanical sensor, capacitive sensors, infrared sensors, heat sensors, moisture sensors, pressure sensors, biometric sensors, and combinations of the same.

A yet further embodiment of the present invention provides such a system wherein the biometric sensors are biometric sensors selected from the group consisting of fingerprint scanners, retina scanners, and DNA analyzer.

Still another embodiment of the present invention provides such a system wherein the at least one feedback device comprises an illumination of the system.

A still further embodiment of the present invention provides such a system wherein the illumination is at least one light emitting diode disposed within the surface of the system and facing the user.

Even another embodiment of the present invention provides such a system having wherein the illumination emits different colors depending on the conditions.

An even further embodiment of the present invention provides such a system having ambient light detectors communicating ambient light data to the processor whereby intensity of the illumination is varied depending on the ambient light data.

A still even another embodiment of the present invention provides such a system wherein at least one predefined portion of the system is configured to be illuminated while the system is in operation in a color indicating that hand placement on the predefined portion is sub-optimal.

A still even further embodiment of the present invention provides such a system wherein the predefined portion represents hand placements which would interfere with an airbag installed in the steering wheel.

Still yet another embodiment of the present invention provides such a system wherein an alert to the user by the at least one feedback device increases in intensity with the duration of the condition.

A still yet further embodiment of the present invention provides such a system wherein the processor calculates the size of the first and second user hands based on a number of sensors in the array activated by the first user hand and the number of sensors activated by the second user hand.

Even yet another embodiment of the present invention provides such a system wherein the system compares the size of the first user hand with the size of the second user hand and identifies size disparities between the first and second user hands as a condition indicative of unsafe user hand position.

Even yet further embodiment of the present invention provides such a system wherein the processor identifies a lack of movement by at least one of the first and second user hands as indicative of a condition indicative of unsafe user hand position.

Still even yet another embodiment of the present invention provides such a system wherein the system is integrated into the steering wheel.

A still even yet further embodiment of the present invention provides such a system having a steering wheel cover wherein the sensor array is disposed.

Yet still even another embodiment of the present invention provides such a system wherein the at least one feedback device comprises an audio indicator, illuminations, heads-up display alerts, or visual display.

A yet still even further embodiment of the present invention provides such a system wherein the detection of more than the first and the second hands is identified by the processor as indicative of unsafe user hand position.

One embodiment of the present invention provides a method for the detection of user hand placement on a steering wheel, the method comprising: initiating a polling loop while the vehicle is in motion but not turning: dividing sensor data into a plurality of segments; testing for a valid hand position based on activated sensor data; the valid hand position comprising first and second hands of about approximately the same size and covering a predetermined number of segments; if the first and second hands are dissimilar in size, logging an event notice and activating an alert; if an active number of segments exceeding the predetermined number of segments are activated, logging an event and activating an alert; and if an active number of segments are less than the predetermined number of segments are activated, logging an event and activating an alert after a preset delay.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
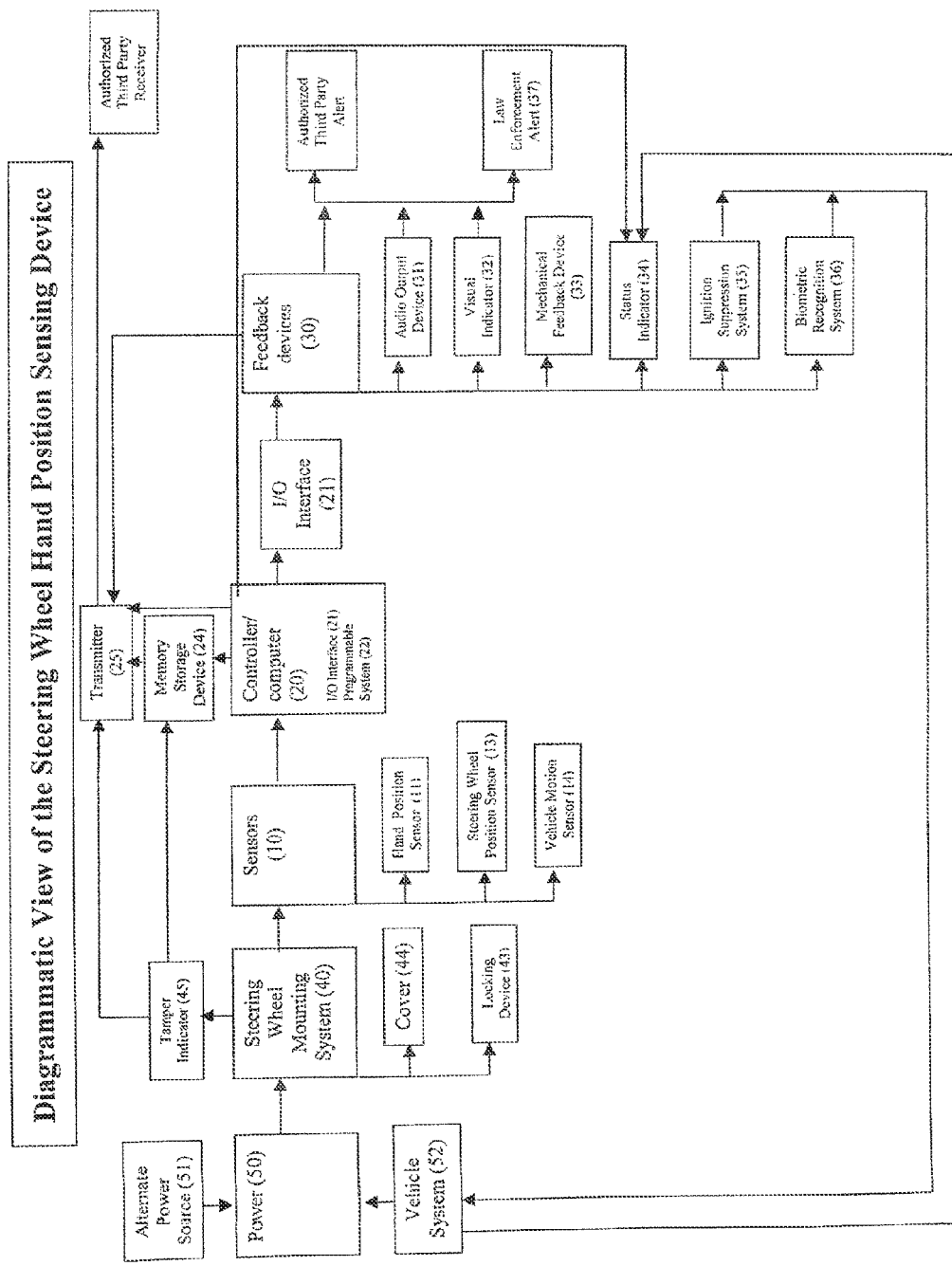
FIG. 1 is a flow chart illustrating a system for the monitoring hand position of a driver configured in accordance with one embodiment of the present invention.
Figure 2:
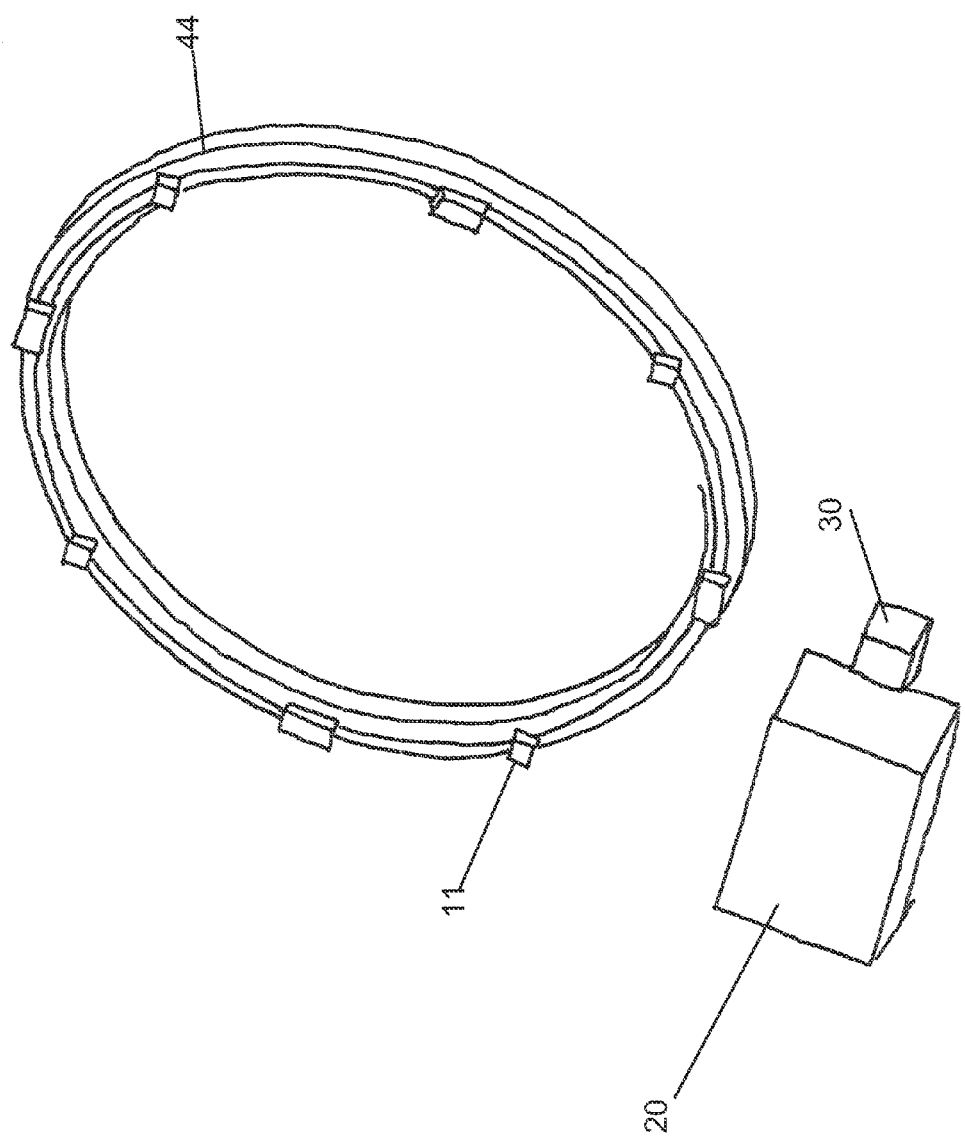
FIG. 2 is a block diagram illustrating a system for the monitoring hand position of a driver configured in accordance with one embodiment of the present invention.

Turning now descriptively to the drawings, in which similar reference characters denote similar elements throughout the several views, the figures illustrate a sensor array, a computer or controller device, data logging system, feedback devices, steering wheel mounting system, an accelerometer, driver identification system and power source.

In one embodiment of the present invention, illustrated in FIG. 1 a series of sensors, which may be touch, pressure, infrared, motion, moisture, magnetic, or others, in linear, web or other configuration that are integrated into the Steering Wheel Mounting System to detect the presence, location and size of the driver's hands on the steering wheel. This information is then sent to the computer controller device.

Strategically placed sensors are located around the circumference of the device. These hand position location sensors 11 are used to detect the presence or absence of hand placement and location on the steering wheel. The sensor connections 12 route to the I/O interface 21.

The steering wheel position sensing device/level indicator 13 has the ability to detect steering wheel rotation during navigation. The vehicle motion sensor 14 detects whether the vehicle is at rest or moving. In one embodiment this could be an accelerometer.

The sensors 11 used can be any type of sensor including but not limited to touch, pressure, infrared or mechanical used in any quantity or combination or placement. The vehicle motion sensor 14 can be but is not limited to inertia sensor, GPS receiver or other motion detecting device internal or external hard-wired or wireless. Sensors 10 are connected to the I/O interface 21 wirelessly, by wired conductive material or in combination. Wireless transmission may be achieved through a variety of protocols and systems, including but not limited to Bluetooth. Sensors 10 may utilize digital, analog or other technologies. Sensors 11 may be arranged in the optimal number and circumferential location as warranted by design parameters and custom configurations.

The controller, of one embodiment, is a programmable device that receives information from the sensor array and other system elements and initiates pre-programmed responses. The computer or controller 20 is a programmable system 23 that consists of a central processing unit, data storage capability, input/output controls, and integrated software and firmware.

The I/O interface 21 communicates with sensing devices 10 and internal and/or external feedback devices 30. Feedback devices 30 may include light displays identifying appropriate hand positions, zones where unsafe hand positions would occur, or other visual indicia of appropriate hand placement. Such visual displays may be adjusted in intensity by one or more ambient sensors disposed in the cabin. Software algorithms 22 measure and control the performance of this device. This software 22 controls the basic function and operation of the entire system of sensors 10, interfaces, and feedback devices 30.

A software algorithm executed in accord with one embodiment of the present invention is described as follows:

The computer 20 is programmable to allow for modification of software and firmware 22 as needed to enhance the system's performance, capabilities and features.

The memory storage device 24 uses volatile and/or non-volatile memory components. It receives data from the feedback devices 30 and the sensor array 10 through the I/O interface 21 and records significant incidents and changes to system status.

The transmitter 25 feature uses data from the feedback devices 30 to determine if alerts will be communicated to authorized system administrator(s) to send real-time information to third parties (e.g. The owner, parent, employer, law enforcement agencies, or other reporting entity).

The controller or computer 20 communicates with the feedback devices 30 and the sensor array 10 through the I/O interface 21 via either wired or wireless communications through various transmitters/receivers 25. For example, infrared or radio waves but not limited to these technologies. The I/O interface 21 can communicate with the car's onboard computer or any other vehicle systems or networks.

In one embodiment of the present invention, feedback devices 30 receive signals from the controller 20 and provide audio, visual, noise cancelling, mechanical, and/or other signals to the driver to direct appropriate hand position on the steering wheel. In one embodiment, the feedback devices may be integrated into the vehicle's electronic system to allow override of the vehicle's radio and other systems if necessary. This may require proximity to the vehicle's buss or connection to the buss, while other embodiments may allow feedback devices 30 to be disposed in the wheel itself or in its cover.

Figure 3:
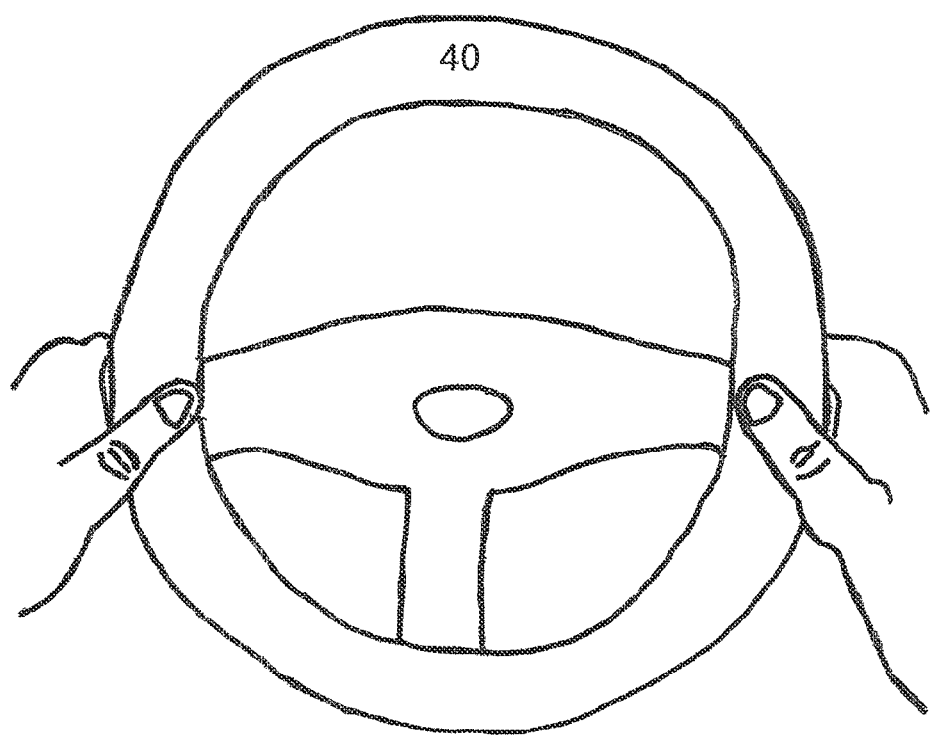
FIG. 3 is a elevation view illustrating a system for the monitoring hand position of a driver configured in accordance with one embodiment of the present invention with a driver hand position in an approved 9 o'clock and 3 o'clock position.
Figure 4:
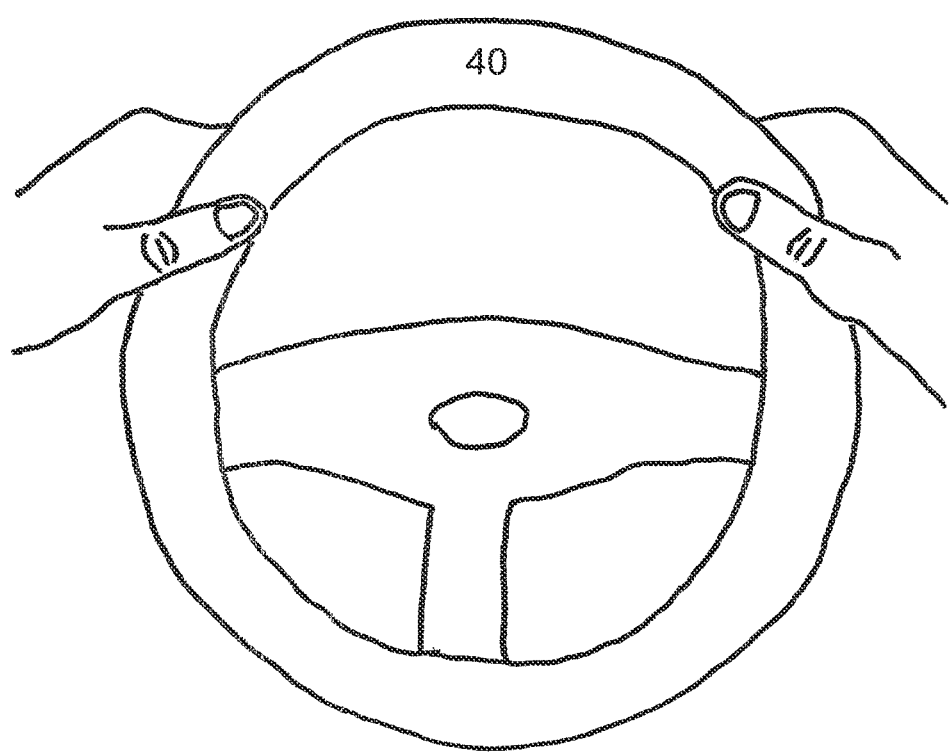
FIG. 4 is a elevation view illustrating a system for the monitoring hand position of a driver configured in accordance with one embodiment of the present invention with a driver hand position in an approved 10 o'clock and 2 o'clock position.

The system, according to one embodiment, utilizes various feedback devices 30 for multiple constituents. The audio output device 31 consists of a speaker or other device that emits an audible signal. This is a pre-defined, temporary auditory signal indicating the driver is not following the authorized hand positions such as those illustrated in FIGS. 3 and 4 on the steering wheel. The sound, volume, duration and frequency of the auditory signal is controlled by the software algorithm 22, such as that outlined in Flow diagram of FIG. 8 described above.

Figure 9:
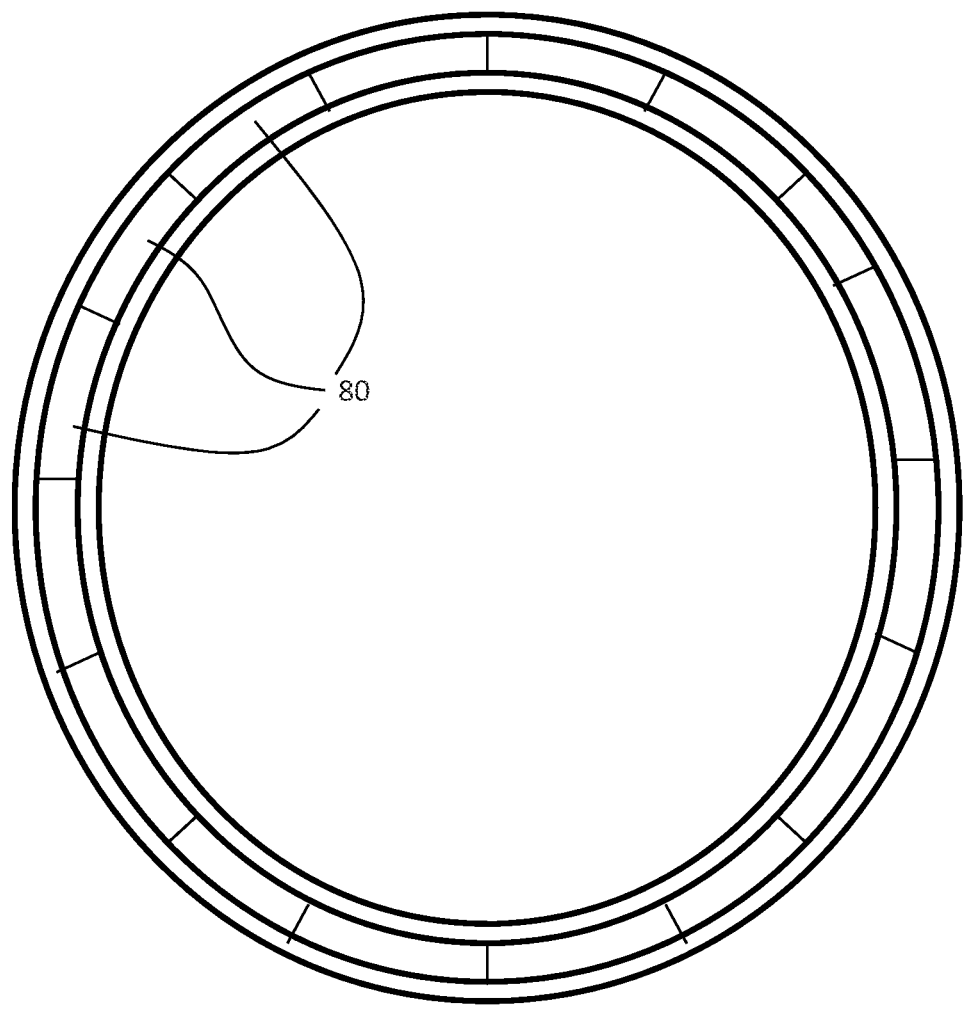
FIG. 9 is an elevation view illustrating a system for the monitoring hand position of a driver configured in accordance with one embodiment of the present invention.

A visual indicator 32, may be provided having a light, display, or other device that is integrated or external and emits light in the visible range. In one embodiment illustrated in FIG. 9, a series of LED lights 80 may be embedded in the steering wheel or, as in FIG. 7 housed in a shell 78. In one embodiment it creates a pre-defined temporary visual display indicating the driver is not following the prescribed hand positions on the steering wheel as in FIGS. 3 and 4, while in others positive reinforcement may be provided by means of color indicating correct hand placement. The brightness, color and duration of the visual display are controlled by software 22.

A mechanical feedback device 33, according to one embodiment, provides a mechanism generating a physical vibration otherwise physically alerting the driver that an inappropriate hand position is being used, including transducers, piezoelectric devices or other devices that transmit mechanical vibration to the operator or occupants of the vehicle. It creates a pre-defined temporary sensation indicating the driver is not following the prescribed hand position on the steering wheel. The intensity, vibration, frequency and timing of the mechanical feedback device 33 is controlled by the software algorithm 22.

The status indicator 34 provides an LED 80 or other device that indicates the system status including but not limited to active/inactive mode, error messages or other status. The status indicator device 34 provides operational information about system performance. Status indicators 34 include but are not limited to: if the unit powers on, if the system is functioning properly, tampering with system and recent driver performance (based on gathered data), user defined options (for example, an authorized user can adjust different user profiles to turn on/off or adjust audio output device 31).

The ignition suppression system 35 consists of a wired or wireless application that interfaces with the car's computer, ignition system or any other network. If the present invention has been tampered with the ignition suppression system 35 does not allow the vehicle to start.

In one embodiment a biometric recognition system 36 may be provided having an input device including but not limited to a scanner, microphone or camera, fingerprint, retina and/or DNA identification that utilizes specific user attributes to identify the user and to select the appropriate user profile.

The law enforcement alert 37 communicates with the transmitter 35 which can contact proper authorities. Additionally the law enforcement alert 37 may emit a signal through light, radio frequency waves, sound or other means to provide a mechanism to communicate the driver's improper activity to authorities.

The feedback devices' 30 communications can be transmitted either wirelessly or wired, to integrated or external devices. Authorized personnel are allowed to upload and/or download customized audio tones, custom pre-recorded messages, and visual displays.

The status indicator 34 can use visual and/or auditory displays such as LEDs, incandescent lights, other visual displays such as HUDs (Heads-up Displays), and/or audio tones.

An ignition suppression system 35 can be provided based on electrical signals, or mechanical devices to prevent starting of the vehicle. Such a system would prevent the ignition of the engine when the vehicle did not detect a predefined hand position so as to prevent vehicle travel. Similarly, vehicle movement could be prevented by other overrides, including transmission. So as to avoid sudden and dangerous overrides, the ignition suppression system 35 would, in one embodiment, only be activated if the vehicle's transmission was in the park position.

The biometric recognition system 36 is based on multiple technologies including not limited to fingerprint, retina scan, facial recognition, breath, blood gas or DNA.

The law enforcement alert 37 consists of but is not limited to visual (for example a light on the exterior of the vehicle), or auditory alert, or means of wireless communication (for example, radio or GPS signal) by which means notice is forwarded to a law enforcement monitor that a violation, such as a term of parole, requiring suitable hand positioning while driving has occurred. The law enforcement alert 37 may transmit to one or more of the feedback devices 30.

Systems configured in accord with one embodiment of the present invention may utilize any number and/or combination of the feedback devices 30 listed.

While in some embodiments, the system may be integral to the steering wheel 42 of the vehicle, either installed as original equipment or retrofit post-production. In one embodiment of the present invention, a hand position detector mount 40 is provided allowing for the installation of a system configured according to one embodiment of the present invention without replacement of the steering wheel. Such a mount is a support structure 74 that may be a retrofitted or integrated system that attaches the sensor array and/or other elements to the existing steering wheel. A cover 76 may be supplied to protect sensors 10 and a cover 78 to protect LEDs The steering wheel mounting system 40 is the support structure of one embodiment of the present invention. It provides the means to integrate the sensor array 10, computer controller 20, I/O interface 21, feedback devices 30 and other integrated elements of the system.

In the retrofit application 41, the present invention may be mounted on, in, or around the vehicle's steering wheel. It is designed to be installed by the purchaser. In the retrofit application 41, the present invention is designed to be removable by authorized user if necessary.

A locking device 43 is, in one embodiment, provided having a latching mechanism or other locking system either keyed or keyless to secure the present invention to the steering wheel. This latch includes an anti-tampering mechanism to prevent unauthorized removal of the present invention from the steering wheel. The tamper indicator 45 consists of a visual, auditory, or wireless signal to alert the user and/or authorized persons that the system's integrity has been compromised. This indicator 45 is provided to prevent either deliberate or inadvertent interference with the proper functioning of the system configured according to various embodiments of the present invention. The locking mechanism 43 and/or tamper indicator 45 may or may not be integrated with the biometric recognition system 36, status indicator 34 or other feedback devices 30.

The adjustable harness 44 is designed to accommodate different steering wheel designs and sizes. It includes support and integration structures for the integrated sensor array 10 and any number and/or combination of any features and elements of the described embodiments of the present invention.

A power source 50 may be provided, either integrated into the electronic system of the vehicle or as a stand-alone unit, and supplies the power required by of all of the invention's elements. One such power source 50 for an embodiment of the present invention may be supplied by various sources. In one embodiment of the invention, the alternative power interface 51 may come from renewable energy sources and may supply the power requirements. In another embodiment, the invention may receive power through a vehicle power interface 52 from the vehicle's electrical system. In one embodiment of the present invention the power source may include an internal power regulator 53.

The alternative power interface 51 configured according to one embodiment of the present invention or supply to the present invention may be obtained from renewable sources including but not limited to solar, wind, heat, static, recycled emissions, gyroscopic, mechanical, and magnetic energy. In another embodiment of the invention, power may be supplied by conventional or innovative battery systems 52.

As illustrated in FIG. 1, all connections of the main elements and sub-elements are made by conductive material in the form of conductive membranes, wires, integrated circuit components, vias, wirelessly or a combination of these FIG. 1.

Systems configured according to alternative embodiments of the present invention may be configured to fit other steering or control mechanisms employed in any other vehicle or equipment. The mounting mechanism 40 may be adapted to fit levers, handles, or any other controls. In these variations, the invention could be modified to detect proper position of one hand or both hands and/or the pressure applied. Similarly, other embodiments may incorporate additional driver state sensing mechanisms to monitor driver attention. These mechanisms include but are not limited to moisture sensors, heart rate indicators, or eye position sensing devices. In standard transmission vehicles and other non-automatic transmission vehicles, alternative embodiments may either allow for increased single hand position operation or allow for additional sensors deployed on a transmission shifting controls.

Figure 5:
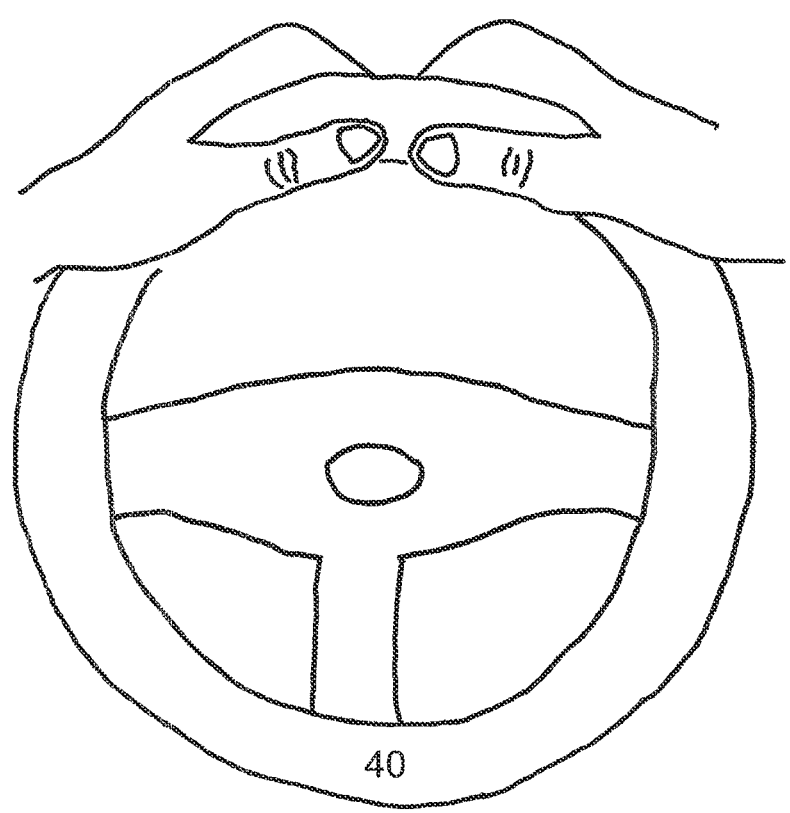
FIG. 5 is a elevation illustrating a system for the monitoring hand position of a driver configured in accordance with one embodiment of the present invention with a driver hand position in a disapproved 12 o'clock position.
Figure 6:
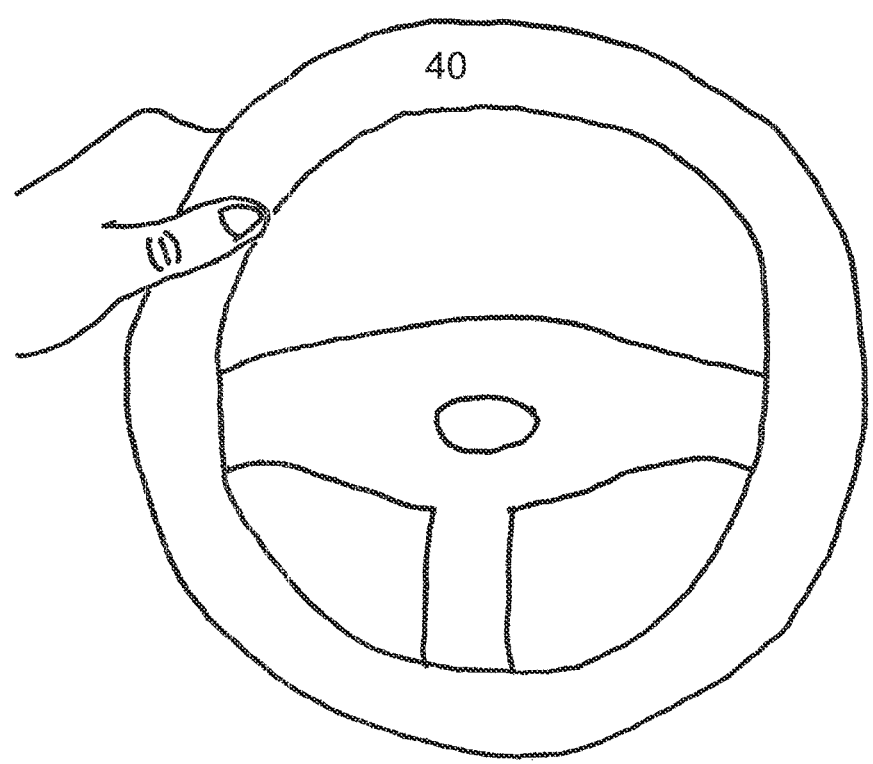
FIG. 6 is a plan view illustrating a system for the monitoring hand position of a driver configured in accordance with one embodiment of the present invention with a driver hand position in a disapproved single handed position.

One embodiment of the invention is activated when the vehicle is in motion. The current embodiment of the invention is configured so that the hand position locating sensors 11 of the sensor array 10 allow acceptable and unacceptable placement of the driver's hands. If two adjacent sensors 11 are activated, the computer or controller 20 triggers the feedback devices 30 to alert the driver of the unsafe hand position such as that illustrated in FIG. 5. The alert may be immediate and may escalate in intensity or number of devices activated. If only one sensor 11 is activated, the response of the feedback devices 30 is delayed for a pre-determined interval of time (e.g. Three seconds) allowing the driver to activate a second non-adjacent sensor 11 within that interval as illustrated in FIG. 6.

If a second non-adjacent sensor 11 is not activated within the interval, the feedback devices 30 are triggered and may escalate in intensity and/or the number of devices activated. If no sensors 11 are activated, the computer or controller 20 may immediately trigger the feedback devices 30. The alert may escalate in intensity or number of devices triggered until two non-adjacent sensors 11 are activated. If two non-adjacent sensors 11 are activated, the system detects proper hand position and feedback devices 30 are not triggered as in FIGS. 3 and 4.

The sensor 11 activation and event data is stored in the memory storage device 24 and can be downloaded or uploaded to external devices through the transmitter 25 or other device where the data can be viewed and evaluated.

One embodiment of the invention can be configured by the authorized system administrator to send real-time information to third parties (e.g. The owner, parent, employer, law enforcement agencies, or other reporting entity).

Figure 7:
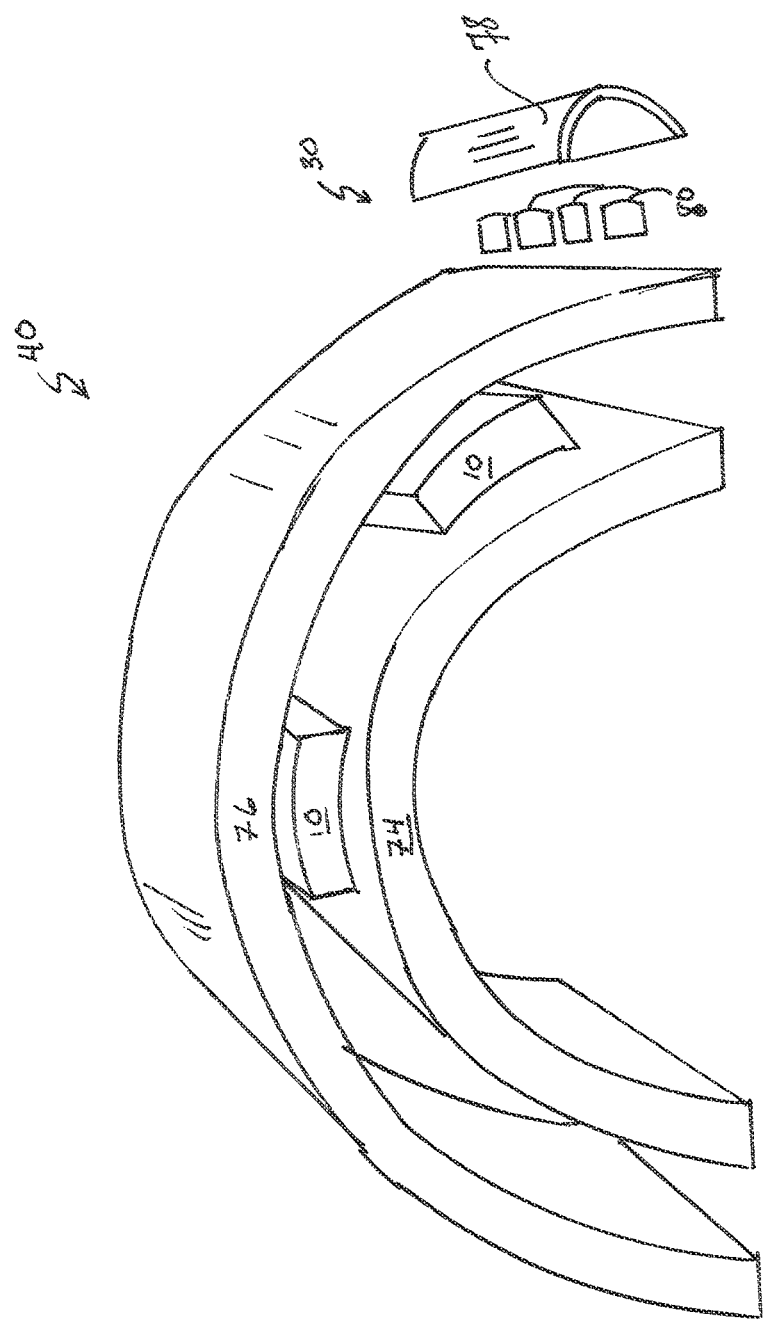
FIG. 7 is a cross sectional perspective view illustrating a system for the monitoring hand position of a driver configured in accordance with one embodiment of the present invention.

The system of the present invention in the retrofit configuration 41 may, as illustrated in FIG. 7, be installed over the existing steering wheel. Only the authorized user and the original equipment manufacturer have override control of the device. In such circumstances, the tamper indicator 45 denotes whether the device has been damaged, altered or removed.

Figure 8:
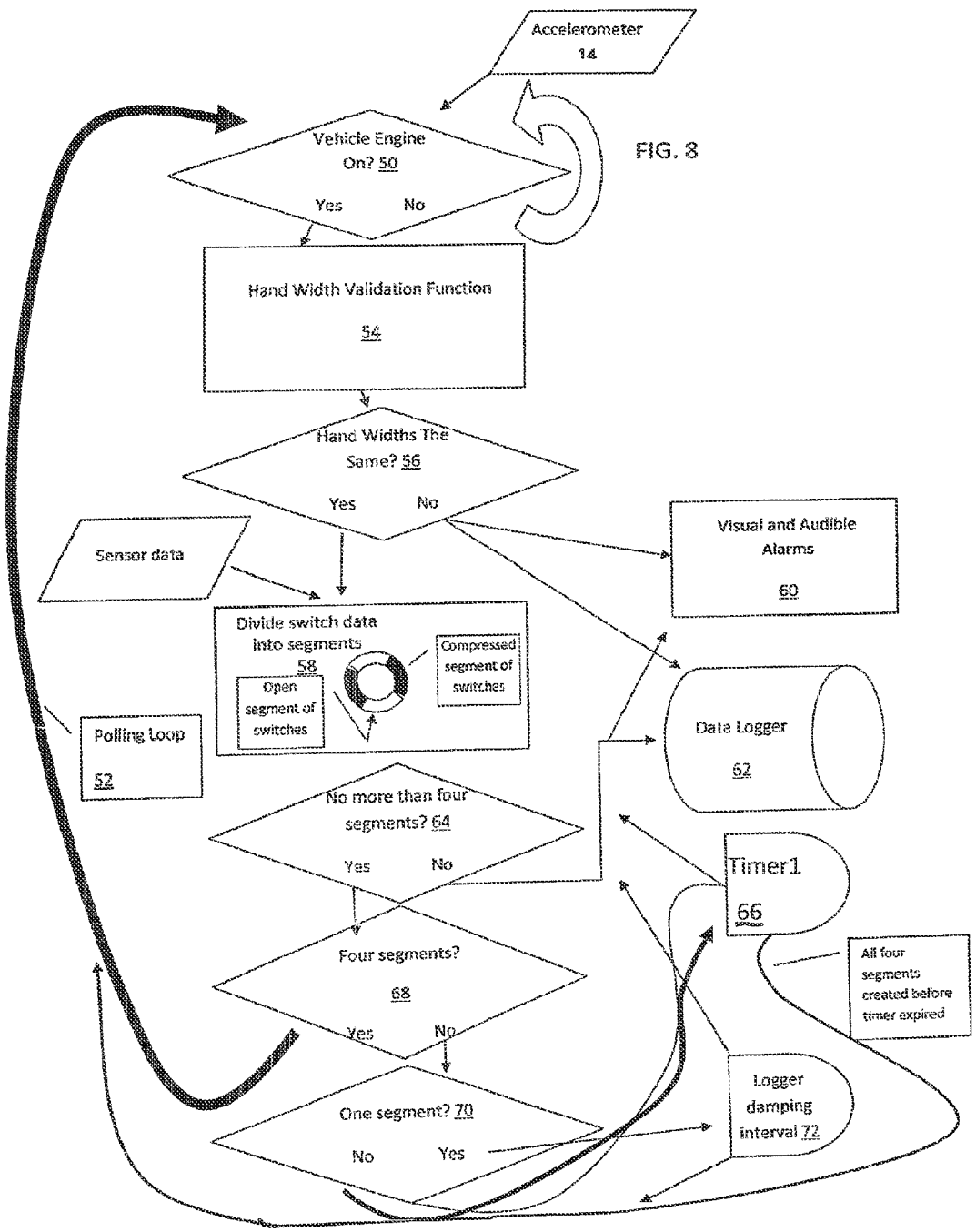
FIG. 8 is a flow chart illustrating a method for the monitoring hand position of a driver configured in accordance with one embodiment of the present invention.

As illustrated in FIG. 8, a flowchart of the operation of a system configured according to one embodiment of the present invention, a data decoder is provided for the data returned from the sensor array is as follows. The device waits for its accelerometer or motion sensor or other data sources, such as vehicle telemetry for drive by wire vehicles, 14 to detect vibrations indicative of the engine running 50. When this happens the polling loop is started 52. Once driver's hands are on the wheel a validation function is started to make sure both hands are relatively the same size (number of switches that are depressed in a row) 54. If both hands are not the same size it means that one of the hands is fake and just an attempt to circumvent the device, the alerts are sounded and the timestamp and offense type are logged immediately 56.

If the hand widths pass the validation function 54 then the readings of the sensors are recorded and divided 58 up into segments (for instance, in the embodiment described two segments for each hand, although one skilled in the art would appreciate that other embodiments may use other sensor array segments and thus have other representative lengths of "true" hands) two strings of open switches and two strings of closed switches (where the hands are located). If there are more than four segments 64 that means that both the "hands" are fake and the driver has grabbed a third location to correct the wheel. When this happens the alerts are triggered 60 and the timestamp 66 and the offense type are logged 62. However, if all four segments detect hand position or identified, then the driver has safe hand position and the polling loop starts again 68. If less than the four segments 70 are identified the data would be interpreted as follows:

If there is only one segment, then the driver has no hands on the wheel then the alerts are sounded immediately and after a variable interval 72, for example one second (hereafter referred to as the logger damping interval), the data is logged.

If three segments exist that means the driver has one hand on the wheel and timer1 66 is started and after the variable time, for example three seconds, the alerts 60 are sounded and the data is logged 62 after the logger damping interval 72.

If there are more than four segments 64 while the accelerometer 14 detects a major turn of the wheel that proves that one of the hands is fake and the alerts 60 will sound and the data 62 will be logged immediately. This is because when performing a turn both the driver's hands must be on the wheel. Therefore, if there is more than two then one must be fake.

If, however, during any time the accelerometer 14 stops reading the vibrations of the motor 50 (indicative of the engine turning off) then the polling loop 52 is put on hold until the motor starts back up 50.

Settings may be configured to adapt to specific requirements of vehicles, manufacturers, or regulators. Airbag equipped cars may require specific hand configurations. Monitoring services may be provided by manufactures or other service providers monitoring for violations and reporting them to subscribers.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for detection of user hand position on a steering wheel, the system comprising:
   a sensor array disposed on the circumference of said wheel configured to detect contact of first and second user hands with said sensor array;
   a processor whereby data from said sensor array is received and processed generating user hand size, location and movement data;
   at least one feedback device whereby a user is alerted to an unsafe hand position,
   said processor being configured to detect conditions in said size, location, and movement data indicative of unsafe user hand position, allow a delay for correction of said condition and communicate existence of said condition for a period exceeding said delay to said at least one feedback device, said processor calculating the size of said first and second user hands based on a number of sensors in said array activated by said first user hand and the number of sensors activated by said second user hand and identifies size disparities between said first and second user hands as a condition indicative of unsafe user hand position;
   a data logger configured to record said conditions in said size, location, and movement data indicative of said unsafe user hand position;
   a tamper indicator whereby unauthorized access to said sensor array, said processor, or said at least one feedback device is communicated to authorized noticees;
   a transceiver communicating with said processor whereby data relating to unsafe user hand positions is transmitted to said authorized noticees.

2. The system of claim 1 further comprising a vehicle movement indicator, said vehicle movement indicator communicating vehicle direction, speed, and acceleration data to said processor.

3. The system of claim 2 wherein said vehicle movement indicator is an accelerometer.

4. The system of claim 1 wherein said sensor array comprises sensors selected from the group of sensors consisting of: magnetic sensors, field effect sensing sensors, optical sensors, mechanical sensor, capacitive sensors, infrared sensors, heat sensors, moisture sensors, pressure sensors, biometric sensors, and combinations of the same.

5. The system of claim 4 wherein said biometric sensors are biometric sensors selected from the group consisting of fingerprint scanners, retina scanners, and DNA analyzer.

6. The system of claim 1 wherein said at least one feedback device comprises an illumination of said system.

7. The system of claim 6 wherein said illumination is at least one light emitting diode disposed within a surface of the system and facing the user.

8. The system of claim 6 wherein said illumination emits different colors depending on said conditions.

9. The system according to claim 6 further comprising ambient light detectors communicating ambient light data to said processor whereby intensity of said illumination is varied depending on said ambient light data.

10. The system according to claim 6, wherein at least one predefined portion of said system is configured to be illuminated while said system is in operation in a color indicating that hand placement on a top third portion of the wheel is sub-optimal.

11. The system according to claim 10 wherein said predefined portion represents hand placements which would interfere with an airbag installed in said steering wheel.

12. The system according to claim 1 wherein an alert to said user by said at least one feedback device increases in intensity while said condition persists.

13. The system of claim 1 wherein said processor identifies a lack of movement by at least one of said first and second user hands as indicative of a condition indicative of unsafe user hand position.

14. The system of claim 1 wherein said system is integrated into said steering wheel.

15. The system of claim 1 further comprising a steering wheel cover wherein said sensor array is disposed.

16. The system according to claim 1 wherein said at least one feedback device comprises an audio indicator, illuminations, heads-up display alerts, or visual display.

17. The system of claim 1 wherein the detection of more than said first and said second hands is identified by said processor as indicative of unsafe user hand position.

18. A method for the detection of user hand placement on a steering wheel, said method comprising:
   initiating a polling loop while a vehicle is in motion but not turning:
   dividing sensor data into a plurality of segments where a hand of said user placed in contact with the steering wheel activates sensors in a segment;
   testing for a valid hand position based on activated sensor data;
   said valid hand position comprising first and second hands of about approximately the same size and said first and second hands covering a predetermined number of segments from said plurality of segments;
   if said first and second hands are dissimilar in size, logging an event notice and activating an alert;
   if an active number of segments exceeding said predetermined number of segments are activated, logging an event and activating an alert; and
   if an active number of segments are less than said predetermined number of segments are activated, logging an event and activating an alert after a preset delay.

* * * * *